United States Patent
Brown

(10) Patent No.: US 12,095,127 B2
(45) Date of Patent: Sep. 17, 2024

(54) SOLID OXIDE FUEL CELL SYSTEM WITH CARBON CAPTURE AND INCREASED EFFICIENCY

(71) Applicant: VERSA POWER SYSTEMS LTD, Danbury, CT (US)

(72) Inventor: Casy Cloudless Brown, Calgary (CA)

(73) Assignee: VERSA POWER SYSTEMS LTD, Danbury, CT (US)

( * ) Notice: Subject to any disclaimer, the term of this patent is extended or adjusted under 35 U.S.C. 154(b) by 28 days.

(21) Appl. No.: 17/541,575

(22) Filed: Dec. 3, 2021

(65) Prior Publication Data
US 2022/0246966 A1 Aug. 4, 2022

Related U.S. Application Data

(60) Provisional application No. 63/199,060, filed on Dec. 4, 2020.

(51) Int. Cl.
*H01M 8/04* (2016.01)
*H01M 8/0668* (2016.01)
*H01M 8/12* (2016.01)

(52) U.S. Cl.
CPC .. *H01M 8/0668* (2013.01); *H01M 2008/1293* (2013.01)

(58) Field of Classification Search
CPC .................................................. H01M 8/0668
See application file for complete search history.

(56) References Cited

U.S. PATENT DOCUMENTS

| 6,572,996 B1 * | 6/2003 | Isenberg ............. H01M 8/2484 429/422 |
| 2013/0108936 A1 * | 5/2013 | McElroy ........... H01M 8/04097 429/410 |

(Continued)

FOREIGN PATENT DOCUMENTS

| CN | 105845962 | 8/2016 |
| WO | WO-2015/116964 A1 | 8/2015 |

(Continued)

OTHER PUBLICATIONS

Dijkstra et al., "Novel Concepts for CO2 Capture With SOFC", GHGT-6, Nov. 2002, (25 pages).

(Continued)

*Primary Examiner* — Olatunji A Godo
(74) *Attorney, Agent, or Firm* — Foley & Lardner LLP

(57) ABSTRACT

A fuel cell system includes a fuel cell module having an inlet and an outlet. The fuel cell module receives a fuel stream including gaseous fuel and expels a depleted fuel stream. The system also includes an exhaust processing module disposed relative to the fuel cell module such that waste heat from the fuel cell module is usable by the exhaust processing module. The system is configured to direct a first portion of the depleted fuel stream to the exhaust processing module, where the depleted fuel stream includes depleted fuel and at least one gaseous byproduct including oxygen and carbon dioxide. The exhaust processing module subjects the first portion of the depleted fuel stream to co-electrolysis using the waste heat from the fuel cell module to produce a fuel-enriched stream. The system is configured to direct the fuel-enriched stream to the inlet of the fuel cell module.

20 Claims, 4 Drawing Sheets

(56) References Cited

U.S. PATENT DOCUMENTS

2015/0280265 A1* 10/2015 McLarty ........... H01M 8/04365
429/410
2019/0148753 A1* 5/2019 Jahnke ................ H01M 8/0656
429/411

FOREIGN PATENT DOCUMENTS

WO    WO-2017/087405 A1    5/2017
WO    WO-2020/015894 A1    1/2020

OTHER PUBLICATIONS

Garcia, M., "New IEAGHG Technical Report—Mar. 2019 Review of Fuel Cell Technologies with CO2 Capture for the Power Sector", IEAGHG, May 13, 2019, Retrieved from https://ieaghg.org/ccs-resources/blog/new-ieaghg-technical-report-review-of-fuel-cell-technologies-with-co2-capture-for-the-power-sector.

U.S. Department of Energy, "Post-Combustion Carbon Capture Research", Office of Fossil Energy and Carbon Management, Retrieved from https://www.energy.gov/fecm/science-innovation/carbon-capture-and-storage-research/carbon-capture-rd/post-combustion-carbon.

Cheng, T. et al., "Performance evaluation and optimization of a solid oxide fuel cell system combined with solid oxide electrolysis cell" 2017 Chinese Automation Congress (CAC), IEEE, Oct. 20, 2017 (Oct. 20, 2017), pp. 2473-2477.

International Search Report and Written Opinion in PCT/US2021/061745 dated Oct. 28, 2022 (15 pages).

* cited by examiner

SOLID OXIDE FUEL CELL SYSTEM WITH CARBON CAPTURE AND INCREASED EFFICIENCY

CROSS-REFERENCE TO RELATED APPLICATIONS

This application claims the benefit and priority to U.S. Provisional Application No. 63/199,060, filed Dec. 4, 2020, which is incorporated herein by reference in its entirety.

BACKGROUND

The present application relates generally to the field of solid oxide fuel cell (SOFC) systems and, more particularly, SOFC systems having high purity carbon dioxide ($CO_2$) exhaust streams to facilitate carbon capture.

Generally, a fuel cell includes an anode, a cathode, and an electrolyte layer that together drive chemical reactions to produce electricity. Specifically, an SOFC is a solid electrochemical cell comprising a solid, gas-impervious electrolyte sandwiched between a porous anode and porous cathode. Oxygen is transported through the cathode to the cathode/electrolyte interface where it is reduced to oxygen ions, which migrate through the electrolyte to the anode. At the anode, the ionic oxygen reacts with fuels such as hydrogen or methane and releases electrons. The electrons travel back to the cathode through an external circuit to generate electric power.

Anode exhaust, which may include a mixture of steam, hydrogen, carbon monoxide, and carbon dioxide, is produced as a byproduct from the anode of the fuel cell. The anode exhaust contains useful byproduct gases such as hydrogen and carbon monoxide, which can be exported as syngas for other uses, such as fuel for the fuel cell or feed for other chemical reactions. Furthermore, $CO_2$ and water in said exhaust may also be exported for sequestration or further downstream processing. However, to prepare the anode exhaust to be suitable for such uses, the $CO_2$ present in the anode exhaust must be separated from the remaining byproduct gases.

Accordingly, it would be advantageous to provide an SOFC system that delivers a $CO_2$-rich exhaust stream to enable easy carbon capture without compromising system efficiency or incurring excessive operation costs.

SUMMARY

One aspect of the present disclosure relates to a fuel cell system. The system includes a fuel cell module having an inlet and an outlet, the fuel cell module configured to receive a fuel stream comprising gaseous fuel at the inlet and to expel a depleted fuel stream from the outlet. The system further includes an exhaust processing module in fluid communication with the fuel cell module. The exhaust processing module is disposed relative to the fuel cell module such that waste heat from the fuel cell module is usable by the exhaust processing module. The system is configured to direct a first portion of the depleted fuel stream to the exhaust processing module, where the depleted fuel stream includes depleted fuel and at least one gaseous byproduct including oxygen and carbon dioxide. The exhaust processing module is configured to subject the first portion of the depleted fuel stream to co-electrolysis using the waste heat from the fuel cell module to produce a fuel-enriched stream. The system is configured to direct the fuel-enriched stream to the inlet of the fuel cell module.

In various embodiments, the system also includes a controller configured to operate at least one of the fuel cell module or the exhaust processing module based on a composition of the depleted fuel stream. In some embodiments, the fuel cell module includes at least one solid oxide fuel cell. In other embodiments, the exhaust processing module includes at least one solid oxide electrolysis stack. In yet other embodiments, the exhaust processing module is contained within the fuel cell module. In various embodiments, the fuel cell module includes a plurality of fuel cell stacks, where a first subset of the plurality of the fuel cell stacks are solid oxide fuel cells, and where a second subset of the plurality of the fuel cell stacks are solid oxide electrolysis stacks. In some embodiments, the exhaust processing module is separate from the fuel cell module. In other embodiments, the exhaust processing module includes a plurality of branches electrically connected in parallel, each of the plurality of branches having at least one solid oxide electrolysis stack, and each solid oxide electrolysis stack including a plurality of solid oxide electrolysis cells.

In various embodiments, the system further includes an afterburner in fluid communication with the fuel cell module and disposed downstream of the outlet. In some embodiments, the afterburner is configured to receive a second portion of the depleted fuel stream and to produce a first exhaust stream by reacting unreacted fuel within the second portion. In other embodiments, the exhaust processing module is configured to expel oxygen produced during co-electrolysis of the first portion in an outlet stream. In yet other embodiments, the system is configured to direct the outlet stream to the afterburner, where oxygen from the first outlet stream facilitates combustion of the unreacted fuel that is included within the first portion. In various embodiments, the afterburner is configured to expel a second exhaust stream consisting of carbon dioxide. In some embodiments, the exhaust processing module is configured to provide a reducing gas to the fuel cell module. In other embodiments, the exhaust processing module is configured to provide the reducing gas to during a shutdown event of the fuel cell system.

Another aspect of the present disclosure relates to a method of operating a fuel cell system. The method includes expelling, by a fuel cell module, a depleted fuel stream from an outlet, the fuel cell module configured to receive gaseous fuel at an inlet. The method further includes receiving, by an exhaust processing module, a first portion of the depleted fuel stream, the first portion comprising depleted fuel and at least one gaseous byproduct including carbon dioxide and oxygen. The method also includes producing, by the exhaust processing module, a fuel-enriched stream from the first portion of the depleted fuel stream by subjecting the first portion to co-electrolysis using the waste heat from the fuel cell module. The method further includes directing, by the fuel cell system, the fuel-enriched stream produced by the exhaust processing module to the fuel cell module.

In some embodiments, the method also includes receiving, by an afterburner in fluid communication with the fuel cell module, a second portion of the depleted fuel stream, and producing, by the afterburner, a first exhaust stream by reacting unreacted fuel within the second portion. In various embodiments, the method also includes removing, by a water knockout unit in fluid communication with the exhaust processing module, water from at least a portion of the fuel-enriched stream. In other embodiments, the method further includes operating, by a controller in communication with the fuel cell system, at least one of the fuel cell module or the exhaust processing module based on a composition of the depleted fuel stream. In yet other embodiments, the controller is configured to adjust at least one operating condition of the fuel cell system based on a composition of gaseous fuel within the fuel cell system.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
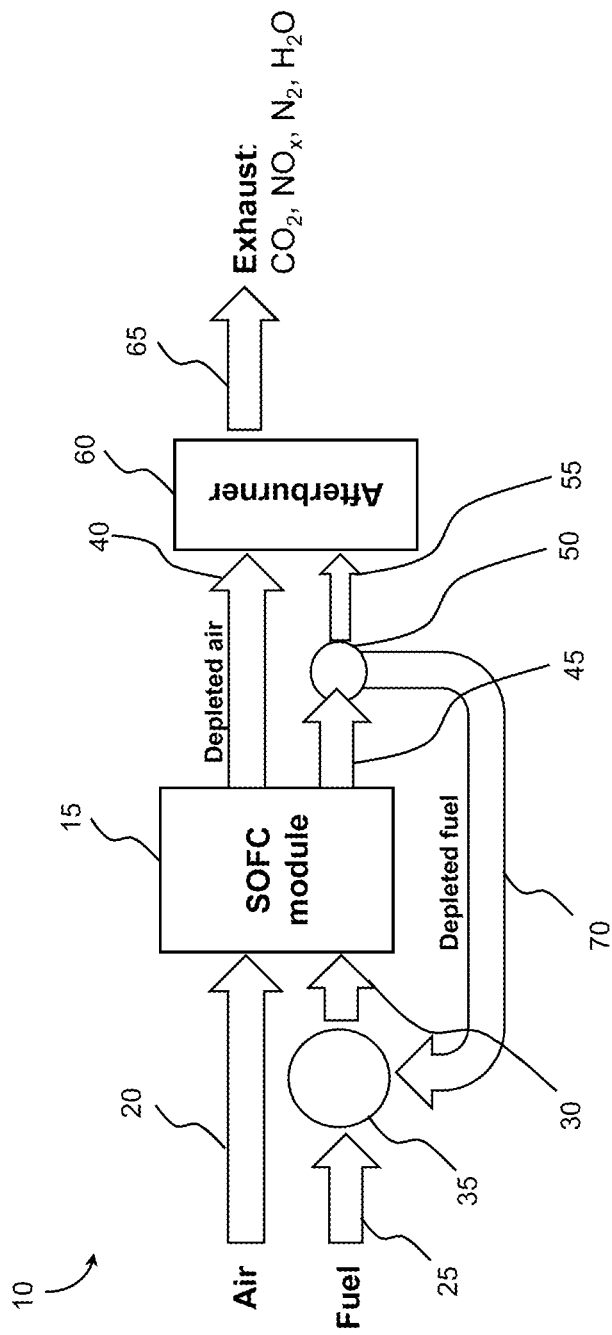
FIG. 1 is a schematic representation of a fuel cell system, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

The present disclosure provides a fuel cell system that enables effective $CO_2$ processing and subsequent carbon capture without inducing efficiency penalty. Moreover, the present fuel cell system that includes an exhaust processing module to not only facilitate the generation of a $CO_2$-rich exhaust stream for enabling carbon capture, but also provide an increased operational efficiency compared to a conventional system. The present fuel cell system circumvents known limitations associated with conventional fuel cell systems configured to recycle anode exhaust streams (e.g., dilution effect).

One embodiment of the disclosure relates to a fuel cell system including a fuel cell module coupled to a fuel supply, an air supply, and a variable load. The fuel cell module may be configured to receive fuel at a fuel electrode (e.g., anode) from the fuel supply via a fuel inlet and receive air at an air electrode (e.g., cathode) from the air supply via an air inlet.

The fuel cell system may further include an exhaust processing module and/or combustion component (e.g., afterburner), which may be fluidly coupled to an outlet of the fuel cell module. The exhaust processing module may be configured to receive at least a portion of the fuel exhaust expelled from the outlet of the fuel cell module as a recycle stream. The exhaust processing module may be further configured to process the received fuel exhaust to enrich fuel content within the recycle stream prior to routing the recycle stream back to the fuel inlet.

In various embodiments, the exhaust processing module may be configured as a solid oxide electrolysis stack (SOEC) module. Accordingly, the SOEC module may receive a portion of the fuel cell exhaust and enrich the fuel content therein via a co-electrolysis process thereby lowering the net fuel supply requirement to the fuel cell system. In various embodiments, the SOEC module may be configured to use waste heat from the fuel cell to facilitate operation within an endothermic region, thereby increasing efficiency of the SOEC module.

A second embodiment relates to use of the electrolysis produced oxygen (e.g., produced by the SOEC module) as the oxidant for the combustion component (e.g., afterburner). In various embodiments, using the electrolysis product as the oxidant allows the exhaust products to be combusted without introducing nitrogen (e.g., from air) such that the final outlet is nearly a pure blend of $CO_2$ and $H_2O$. In various embodiments, the $H_2O$ may be removed from the blend through condensing, leaving a high purity $CO_2$ stream ready for sequestration or use in downstream processes.

Referring to FIG. 1, a schematic representation of a conventional fuel cell system 10 is shown. The fuel cell system 10 may be a solid oxide fuel cell (SOFC) system having an SOFC module 15, which is fluidly coupled to an air supply 20 and a fuel supply 25, and configured to generate power in the form of electricity therefrom. The SOFC module 15 may include a solid electrochemical cell, which includes a solid, gas-impervious electrolyte (e.g., dense ceramic) sandwiched between a porous anode (e.g., porous ceramic) and a porous cathode (e.g., porous ceramic). Oxygen, provided to the SOFC module 15 via the air supply 20, may be transported through the cathode to a cathode/electrolyte interface within the SOFC module 15 where it is reduced to oxygen ions. The oxygen ions may then migrate through the electrolyte within the SOFC module 15 to the anode. At the anode, the ionic oxygen may react with input fuel 30 received from the fuel supply 25 via an inlet manifold 35. In various embodiments, the fuel may be a hydrocarbon, syngas, or any suitable fuel known in the art to release electrons upon reacting with ionic oxygen. Power is produced when the electrons travel back to the cathode through an external circuit.

Upon reacting the ionic oxygen (i.e., produced from received air supply 20) with input fuel 30, the SOFC module 15 may output oxygen depleted air 40 and depleted fuel 45 streams. As shown, the depleted fuel stream 45 may be routed to an output manifold 50, wherein a first portion 55 of the depleted fuel 45 may be sent to a fluidly coupled combustion component ("afterburner") 60 and a second portion or recycle stream 70 of the depleted fuel 45 may form a recycle stream back to the fuel inlet manifold 35. The afterburner 60, which may also receive depleted air 40, is configured to facilitate combustion of remaining oxidant from the depleted air 40 and first portion 55 of the depleted fuel 45 to produce an exhaust stream 65, which includes $CO_2$, nitrous oxides ($NO_x$), nitrogen ($N_2$), and $H_2O$. The exhaust stream 65 may further include oxygen ($O_2$) when the system 10 operates with an excess of air.

In various embodiments, the SOFC module 15 may include a single SOFC cell. In other embodiments the SOFC module 15 may include multiple, assembled fuel cells to form a fuel cell stack. In other embodiments the SOFC module 15 may include multiple fuel cell stacks. In various embodiments, the SOFC module 15 may be configured to output electricity based on demand from one or more variable loads. In various embodiments, the SOFC module 15 and/or coupled components within the fuel cell system 10 may be communicably coupled to one or more controllers to facilitate operation thereof.

The fuel cell system 10 includes a recycle stream to recirculate the depleted fuel 45 back to the SOFC module inlet 30. A fuel recycle stream, such as fuel recycle stream 70, may be used to provide two benefits. In the case of a hydrocarbon fuel, product water in the depleted fuel stream 45 can support steam reforming of the fuel 25, simplifying the overall system by eliminating a requirement for a separate water feed. Furthermore the fuel recycle stream 70 may beneficially increase a total fuel content while adversely decreasing a fuel concentration at the fuel input 30. It is recognized by the state of the art that for best overall system lifetime and efficiency, an excess of fuel is typically required. In particular, it is recognized that it is not practical to operate an SOFC module, such as the SOFC module 15, without excess fuel provided by fuel supply 25. For example, if the SOFC module 15 were to be operated with only a stoichiometric fuel input from the fuel supply 25, the result would be a completely depleted outlet fuel (e.g., depleted fuel stream 45) which, although potentially advantageous for carbon capture, would make the SOFC module 15 unstable and negatively impact both its lifetime and efficiency. Accordingly, an amount of required fuel supplied by the fuel supply 25 may typically be at least 10% in excess of an amount of fuel reacted electrochemically within the SOFC module 15. Furthermore, as the fuel cell system 10 produces an exhaust stream 65 having a multitude of byproducts, including various greenhouse gases and any unreacted fuel, such exhaust stream 65 must be exported for downstream processing prior to distribution for various use applications or prior to non-polluting removal of said gas in the exhaust stream 65. Such added processing further reduces efficacy of the fuel cell system 10.

Figure 2:
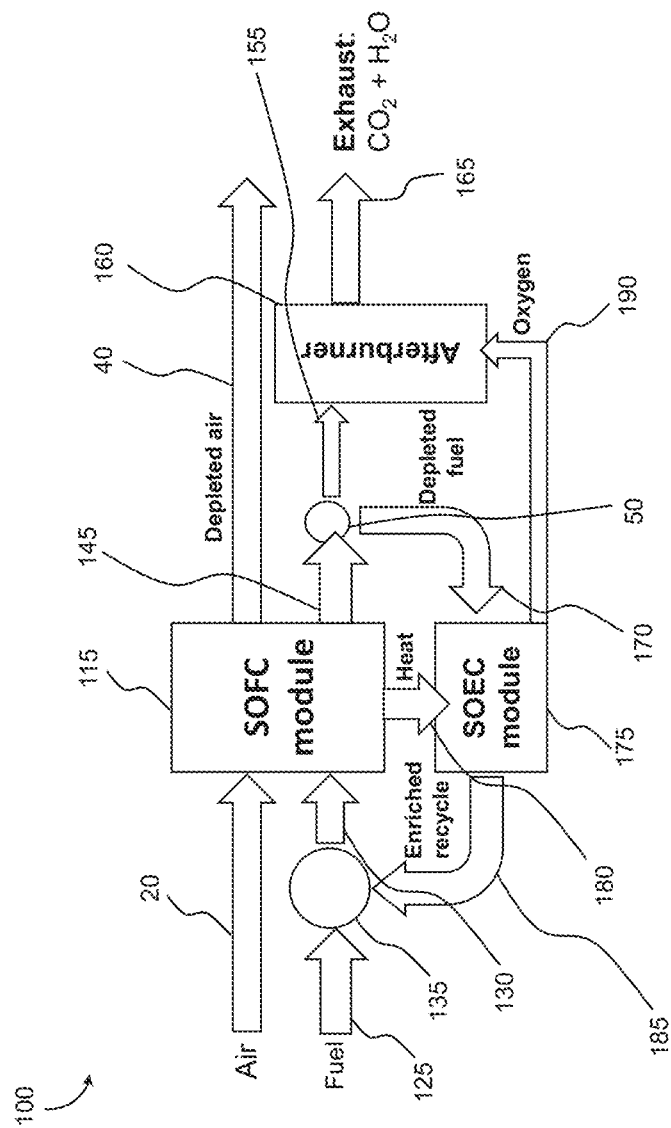
FIG. 2 is a schematic representation of a fuel cell system including an exhaust processing module for carbon capture, according to an exemplary embodiment.

FIG. 2 shows a schematic representation of a fuel cell system 100, according to an exemplary embodiment. In various embodiments, elements 115 through 170 of the fuel cell system 100 are the same or equivalent to corresponding elements 15-70 of the fuel cell system 10. As shown in FIG. 2, the fuel cell system 100 may further include an exhaust processing module 175, which is fluidly coupled to the second portion 170 of the depleted fuel 145. In various embodiments, the exhaust processing module 175 may be an SOEC module. The SOEC module 175 may include multiple branches electrically connected in parallel, wherein each branch includes at least one solid oxide electrolysis cell stack, and wherein each solid oxide electrolysis cell stack includes multiple solid oxide electrolysis cells. In various embodiments, the SOEC module 175 includes an anode, an electrolyte layer, and a cathode, wherein the electrolyte layer serves to transfer ions between the anode and the cathode to facilitate reactions generating electrons to produce electricity.

As shown, the SOEC module 175 may be disposed relative to the SOFC module 115 such that waste heat 180 from the SOFC module 115 may be used by the SOEC module 175 to support operation thereof. The SOEC module 175 may receive the second portion 170 of the depleted fuel 145, which would contain fuel that remained unreacted from the SOFC module 115 in addition to various gaseous byproducts such as, but not limited to $CO_2$ and $H_2O$. The SOEC module 175 may subject the received second portion 170 and undergo a co-electrolysis process (i.e., electrolysis of both $H_2O$ and $CO_2$), facilitated by the waste heat 180, in which the gaseous byproducts may be reacted to form fuel and oxygen. Accordingly, the SOEC module 175 may output a fuel-enriched recycle stream 185, which may then be routed to the input manifold 135 for recirculation through the SOFC module 115. Oxygen produced by the SOEC module 175 may be removed from the SOEC module 175 in an outlet stream 190, which may be supplied as oxidant to the afterburner 160 to facilitate combustion of unreacted fuel remaining in the first portion 155 of depleted fuel 145. As shown, implementing the outlet stream 190 from the SOEC module 175 as oxidant for the afterburner 160 may enable thorough combustion of the fuel in the first portion 155 such that the eventual exhaust stream 165 from the afterburner almost exclusively consists of $CO_2$ and $H_2O$.

Because the fuel cell system 100 regenerates fuel within the SOEC module 175 to produce an enriched recycle stream 185 from the second portion 170 of the depleted fuel 145 from the SOFC module 115, the fuel cell system 100 may reduce a net fuel supply 125 required to operate the fuel cell system 100 (e.g., compared to fuel cell system 10). Efficiency loss attributable to operation of the SOEC module 175 may be compensated for gained efficiency due to lowering of inlet fuel requirement 125, use of waste heat 180, and/or improved gas composition (i.e., higher fuel content due to enriched recycle stream 185) at the inlet 130, the latter of which may enable lower relative parasitics within the fuel cell system 100 and/or a higher operation voltage of the SOFC module 115 (e.g., compared to that of fuel cell system 10).

In various embodiments, the SOEC module 175 may be configured as a separate module from the SOFC module 115 and may exchange heat therewith via one or more gas streams. In other embodiments, the SOFC module 115 may comprise multiple stacks, each stack comprising multiple cells, wherein a portion of cells within each of the stacks may be SOEC cells. In yet other embodiments, the SOFC module 115 and the SOEC module 175 may collectively form a plurality of stacks, wherein the SOEC module 175 is contained within one of the plurality of stacks.

In various embodiments, the SOEC module 175 may be configured to contribute to balance of plant and/or load following operations of the fuel cell system 100 by assisting in load absorption and/or power release. In various embodiments, the SOEC module 175 may be configured to facilitate preservation of fuel cell system 100 components during shut down events. In various embodiments, the SOEC module 175 may be configured to act as a reducing gas source to protect the anode of the SOFC module 115. In various embodiments, the SOEC module 175 may be configured to introduce reducing gas over a period of time during or immediately following a shutdown event.

In various embodiments, the fuel cell system 100 may be operably coupled to one or more controllers, the one or more controllers configured to control operation of the SOFC module 115, the SOEC module 175, and/or other components included within the fuel cell system 100. Accordingly, in various embodiments, the fuel cell system 100 may be configured to monitor a composition of fuel gas input within the SOFC module 115 (e.g., input fuel 130) and/or the SOEC module 175 (e.g., depleted fuel portion 170). In various embodiments, the fuel cell system 100 may be configured to monitor a composition of fuel gas output from the SOFC module 115 (e.g., depleted fuel 145) and/or the SOEC module 175 (e.g., enriched recycle stream 185). Accordingly, the controller may be configured to set and/or adjust one or more operating conditions of the fuel cell system 100 based on monitored fuel gas composition within the system 100. In various embodiments, the fuel cell system 100 may be configured to implement a fuel gas composition following protocol, wherein upon determination (e.g., by the controller) that a fuel gas composition fails to satisfy one or more predetermined thresholds, the SOFC module 115 and/or SOEC module 175 may cooperatively or complementarily adjust operation to return the fuel gas composition (i.e., at an inlet and/or outlet within the system 100) to a satisfactory level. In various embodiments, the fuel cell system 100 may be configured to adjust an amount of fuel gas provided by the fuel supply 125 based on a fuel gas determination (e.g., by the controller).

In various embodiments, the fuel cell system 100 may be operated at or around an operating condition wherein the inlet fuel flow 125 may be set to approximately match the fuel electrochemically consumed in the SOFC module 115 (i.e., a condition known in the art as a 100% fuel utilization condition). Accordingly, when inlet fuel flow 125 is controlled such that substantially all of the inlet fuel is electrochemically consumed in the SOFC module 115, an amount of unreacted fuel in the first portion 155 of the depleted fuel stream 145 may be mostly determined by an operating condition of the SOEC module 175. For pure reactants, (e.g., pure methane) such control may require scaling the inlet fuel flow 125 proportional to an operating current. For fuels having varied compositions (e.g., natural gas), direct scaling of the inlet fuel flow 125 may only be possible with consideration of a composition of inlet fuel and/or exhaust accompanied by composition measurements to facilitate best $CO_2$ capture. Example compositional measurements could include characterization of the inlet fuel flow 125 or exhaust (e.g., depleted fuel stream 145, exhaust stream 165) using gas chromatography or a similar analysis. Additionally or alternatively, measurement of oxygen concentration in an exhaust stream (e.g., depleted fuel stream 145, exhaust stream 165) can be conducted using, for example, one or more oxygen sensors. Accordingly, an amount of oxygen in the outlet stream 190 may be approximately matched with excess fuel in the first portion 155 of the depleted fuel stream 145 when the SOEC module 175 is operated at stoichiometric conditions, such that in a case of a substantially perfect reaction, the afterburner 160 may convert remaining unreacted fuel into $H_2O$ and/or $CO_2$. Thus, for example, by varying a ratio of fuel supplied by the fuel supply 125 to the SOFC module 115 output to above and below 1.0, a stoichiometry in the afterburner 160 may correspondingly vary from lean to rich, respectively. Unlike in a conventional system, such as the fuel cell system 10 for which excess fuel from fuel supply 25 is always required, fuel enrichment provided by the SOEC module 175 in the fuel cell system 200 may instead enable stable operation with inlet fuel from the fuel supply 125 at or below that the level required to support electrochemical power production of the SOFC module 115.

Figure 3:
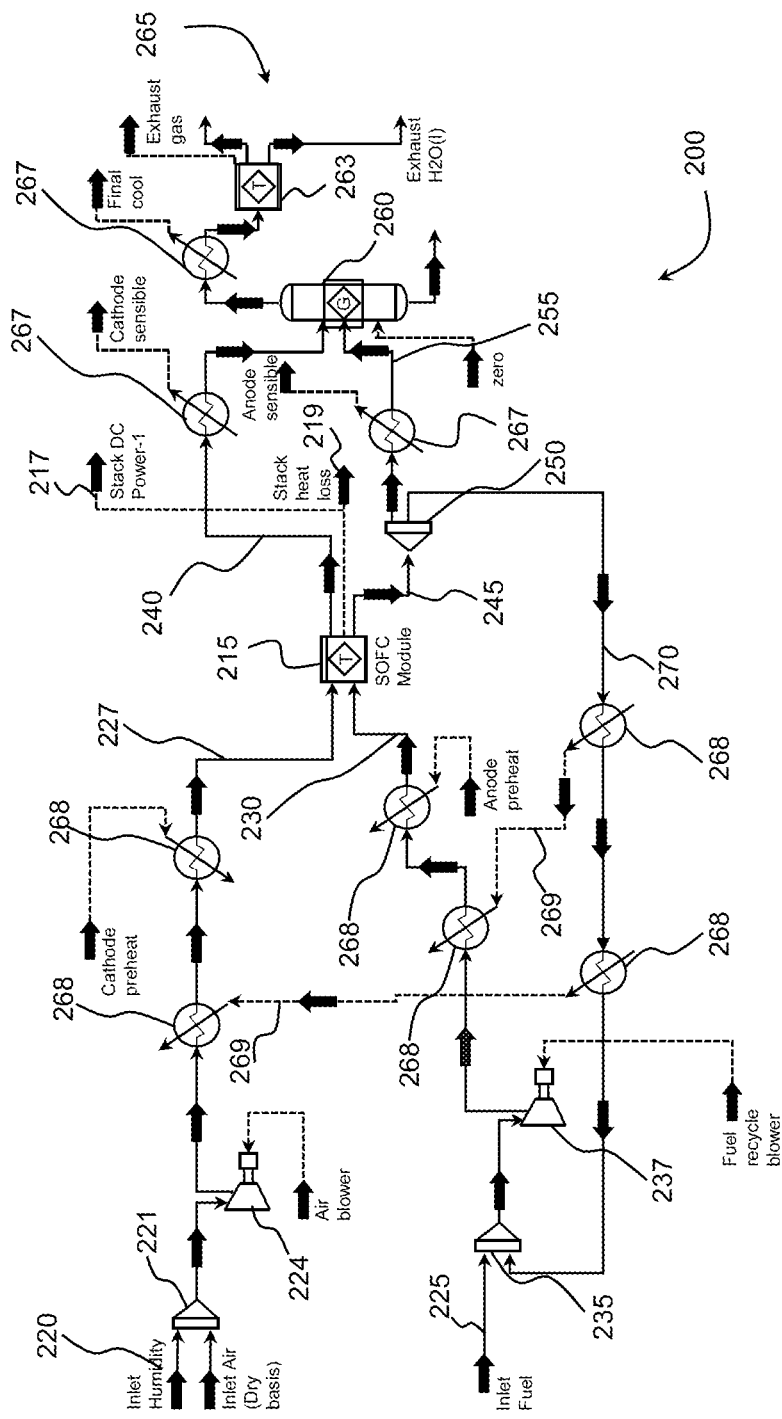
FIG. 3 is a schematic representation of a fuel cell system, according to another exemplary embodiment.

In various embodiments, a fuel cell system may include one or more components to increase and/or regulate a flow of air and/or fuel gas therein. FIG. 3 shows a schematic representation of a conventional fuel cell system 200. The fuel cell system 200 may be an SOFC system having an SOFC module 215, which is fluidly coupled to an air supply 220 and a fuel supply 225, and configured to generate power to support a variable load 217. Heat generated by the SOFC module 215 may be expelled as waste heat 219. As shown, the air from the air supply 220 may enter the fuel cell system 200 via an air inlet manifold 221 and be circulated to the SOFC module 215 via one or more blowers 224 fluidly coupled to air inlet line 227. Similarly, the fuel from the fuel supply 225 may enter the fuel cell system 200 via a fuel gas inlet manifold 235 and be circulated to the SOFC module 215 via one or more blowers 237 fluidly coupled to fuel gas inlet line 230. As shown, air depleted of oxygen may flow away from the SOFC module 215 via a depleted air stream 240. Similarly, fuel gas depleted of fuel may flow away from the SOFC module 215 via a depleted fuel gas stream 245. The depleted fuel gas stream 245 may be fluidly coupled to fuel output manifold 250, wherein the depleted fuel gas stream 245 may be split into a first depleted stream 255 and a second depleted stream 270. As shown, the first depleted stream 255, along with the depleted air stream 240, may be routed to an afterburner 260, which is configured to combust remaining fuel from first depleted stream 255 with oxygen from the depleted air stream 240. In various embodiments, the afterburner 260 may be fluidly coupled to one or more processing units 263, which may process and output the combustion product as an exhaust stream 265 containing a plurality of gaseous byproduct and water.

As shown in FIG. 3, the second depleted fuel stream 270 may flow away from the fuel outlet manifold 250 toward the fuel inlet manifold 235 as a recycle stream such that the depleted fuel may again be circulated to the SOFC module 215 through the fuel gas inlet line 230 via the blower 237. In various embodiments, depleted fuel stream 270 may simultaneously provide additional fuel to the SOFC module 215 (at a lower concentration), in addition to products such as steam ($H_2O$), to support steam reforming without requiring a separate water feed.

Accordingly, fuel supply 225 must continue supplying an amount of fuel gas to the fuel gas inlet line 230 to facilitate operation of the SOFC module 215. As illustrated, the fuel cell system 200 may include a plurality of controllable valve components 267 and 268 (e.g., solenoid valves, poppet valves, etc.) disposed within each of the air inlet line 227, the fuel gas inlet line 230, the depleted air stream 240, and each of the respective first and second depleted fuel gas streams 255 and 270. In various embodiments, the fuel cell system 200 may include a plurality of release flow lines 269, which may be fluidly coupled to the air inlet line 227, the fuel gas inlet line 230, and the second depleted fuel gas stream 270 to facilitate release of pressure therein (e.g., during a shutdown event). As described, the exhaust stream 265 may contain a plurality of gaseous byproduct, which may include, but is not limited to $CO_2$, $NO_x$, $N_2$, and $H_2O$.

In various embodiments, the SOFC module 215 may include a single SOFC cell. In other embodiments the SOFC module 215 may include multiple, assembled fuel cells to form a fuel cell stack. In various embodiments, the SOFC module 215 and/or coupled components within the fuel cell system 200 may be communicably coupled to one or more controllers to facilitate operation thereof.

Figure 4:
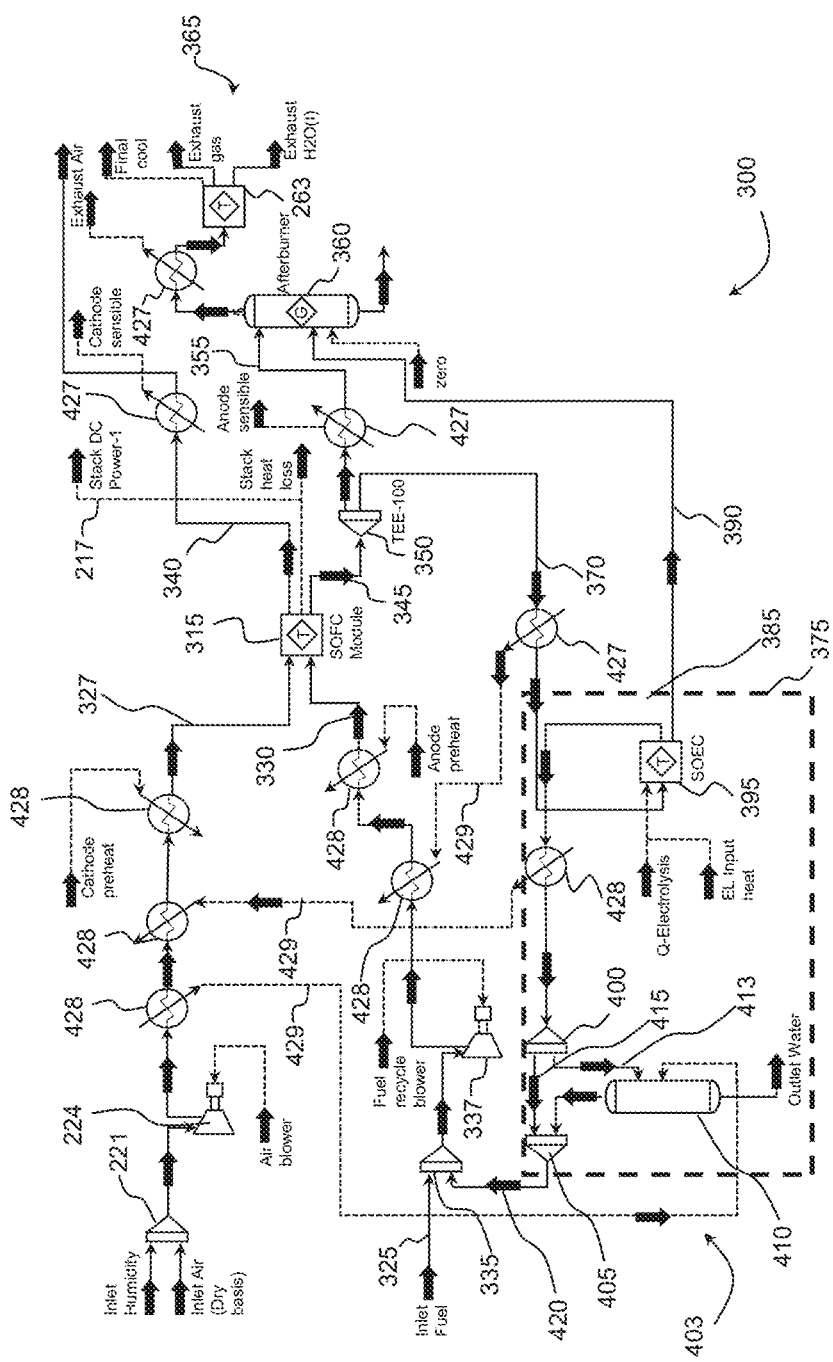
FIG. 4 is a schematic representation of a fuel cell system including an exhaust processing module for carbon capture, according to another exemplary embodiment.

As previously described, to advantageously produce a consolidated final exhaust stream primarily consisting of $CO_2$ and $H_2O$, increase an overall system efficiency system, and reduce an amount of fuel required from a fuel supply, a fuel cell system may include one or more components to process depleted air and/or fuel gas for recycling and facilitate carbon capture. FIG. 4 shows a schematic representation of a fuel cell system 300 including an exhaust processing module 375, according to an exemplary embodiment. In various embodiments, elements 215 through 270 of the fuel cell system 200 are the same or equivalent to corresponding elements 315 through 370 of the fuel cell system 300. Accordingly, the fuel cell system 300 further includes an exhaust processing module 375, which is fluidly coupled to both the second depleted fuel gas stream 370 and the fuel gas inlet manifold 335.

As shown in FIG. 4, the exhaust processing module 375 is configured to receive depleted fuel gas from depleted fuel gas stream 370, which is exhausted from the SOFC module 315 via the fuel gas outlet manifold 350 (e.g., anode exhaust). The received depleted fuel gas from the depleted fuel gas stream 370 is input into an SOEC module 395. In various embodiments, the exhaust processing module 375 may be an SOEC module. The SOEC module 395 may include multiple branches electrically connected in parallel, wherein each branch includes at least one solid oxide electrolysis cell stack, and wherein each solid oxide electrolysis cell stack includes multiple solid oxide electrolysis cells. In various embodiments, the SOEC module 395 includes an anode, an electrolyte layer, and a cathode, wherein the electrolyte layer serves to transfer ions between the anode and the cathode to facilitate reactions generating electrons to produce electricity.

In various embodiments, the SOEC module 395 may be disposed relative to the SOFC module 315 such that waste heat from the SOFC module 315 may be used by the SOEC module 395 to support operation thereof. The SOEC module 395 may receive the second portion 370 of the depleted fuel 345, which would contain fuel that remained unreacted from the SOFC module 315 in addition to various gaseous byproducts such as, but not limited to $CO_2$ and $H_2O$. The SOEC module 395 may subject the received second portion 370 and undergo a co-electrolysis process (e.g., electrolysis of both $H_2O$ and $CO_2$), facilitated by the waste heat, in which the gaseous byproducts may be reacted to form fuel and oxygen. Accordingly, the SOEC module 395 may output a fuel-enriched stream 385, which may then be eventually recirculated through the SOFC module 315. Oxygen produced by the SOEC module 395 may be removed from the SOEC module 395 in an outlet stream 390, which may be supplied as oxidant to the afterburner 360 to facilitate combustion of unreacted fuel remaining in the first portion 355 of depleted fuel 345. As shown, implementing the outlet stream 390 from the SOEC module 395 as oxidant for the afterburner 360 may enable thorough combustion of the fuel in the first portion 355 such that the eventual exhaust stream 365 from the afterburner almost exclusively consists of $CO_2$ and $H_2O$.

As shown in FIG. 4, the fuel cell system 300 may further include a water knockout unit 403, which includes a condenser 410 fluidly coupled to first and second manifolds 400 and 405, respectively. As shown, the water knockout unit 403 may be configured to receive enriched stream 385, which is output from the SOEC module 395. The enriched stream 385 may be received by the first manifold 400, which splits the stream such that a portion first portion 413 is split and circulated to the condenser 410, wherein the excess water may be removed from the first portion 413 of the enriched stream 385. Such a process may not only improve the composition of an eventual recycle stream, but may also act as a cooling mechanism for blower 337, which is configured to circulate fuel gas within the fuel inlet line 330 to the SOFC module 315. In various embodiments, the first portion 413 may comprise less than 20% of the total gas within the enriched stream 385. Once the excess water has been removed from the first portion 413, it may be circulated to the second manifold 405 to be recirculated as a recycled stream 420 to the fuel gas inlet manifold 335. A second portion 415 of the enriched stream 385, which comprises the remainder of the gas within the enriched stream 385, is circulated directly to the second manifold 405, wherein the gas in the second portion 415 may be mixed with the dried first portion 413 as it is recirculated to the fuel gas inlet manifold 335 via the recycle stream 420. In various embodiments, the water knockout unit 403 may be included within the fuel cell system 300 to prevent suppression of stack voltage through supply of excess steam resulting from implementation of the recycle stream 420 coupled with a decreased inlet fuel flow (e.g., at the SOEC module 395). Accordingly, removing water from at least a portion of the enriched stream 385 leaving the SOEC module 395 may facilitate maintaining efficiency of SOEC module 395 stacks. Similar to a conventional system, such as fuel cell system 200, the recycle stream of the fuel cell system 300 (e.g., stream 370) may both increase fuel at the gas inlet line 330 and provide products (e.g., primarily steam, $H_2O$) that may support reforming of the inlet fuel (e.g., at the gas inlet line 330) while providing water (e.g., in the form of steam) necessary to support steam reforming. Unlike a conventional system (e.g., fuel cell system 200), however, the inlet fuel at the fuel gas inlet manifold 335 may be significantly decreased and therefore require less steam ($H_2O$) for reforming and for protection against carbon deposition.

Because the fuel cell system 300 regenerates fuel within the SOEC module 395 to produce an enriched recycle stream 385 from the second portion 370 of the depleted fuel 345 from the SOFC module 315, the fuel cell system 300 may reduce a net fuel supply 325 required to operate the fuel cell system 300 (e.g., compared to fuel cell system 200). Furthermore, efficiency loss attributable to operation of the SOEC module 375 may be compensated for gained efficiency due to use of waste heat and improved gas composition (i.e., higher fuel content due to enriched and dried recycle stream 420) at the inlet manifold 335, the latter of which may enable lower relative parasitics within the fuel cell system 300 and/or a higher operation voltage of the SOFC module 315 (e.g., compared to that of fuel cell system 200).

In various embodiments, the SOEC module 395 may be configured as a separate module from the SOFC module 315 and may exchange heat therewith via one or more gas streams. In other embodiments, the SOFC module 315 may comprise multiple stacks, each stack comprising multiple cells, wherein a portion of cells within each of the stacks may be SOEC cells. In yet other embodiments, the SOFC module 315 and the SOEC module 395 may collectively form a plurality of stacks, wherein the SOEC module 395 is contained within one of the plurality of stacks.

As shown in FIG. 4, the fuel cell system 300 may include a plurality of heat exchange components 427 and 428 disposed within each of the air inlet line 327, the fuel gas inlet line 330, the depleted air stream 340, and each of the respective first and second depleted fuel gas streams 355 and 370. In various embodiments, the fuel cell system 300 may include a plurality of thermal coupling pathways 429, which may be thermally coupled to the air inlet line 327, the fuel gas inlet line 330, and the second depleted fuel gas stream 370 to facilitate thermal management and thermal protection within the system 300.

In various embodiments, the SOEC module 395 may be configured to contribute to balance of plant and/or load following operations of the fuel cell system 300 by assisting in load absorption and/or power release. In various embodiments, the SOEC module 395 may be configured to facilitate preservation of fuel cell system 300 components during shut down events since, generally, electrolyzer systems (such as SOEC module 395) may be rapidly switched on and off load, absorbing relatively large power inputs safely. In general, solid oxide electrolyzers (e.g., such as SOEC module 395) tend to operate endothermically over a wide current density range. Accordingly, the electrochemical efficiency of such systems may exceed 100% for much of their operating window, which may require external heat for sustained operation of the system. Consequently, an SOEC module (e.g., SOEC module 395) may typically operate at higher reaction rates compared to an equivalent SOFC module (e.g., SOFC module 315) before reaching thermal limits, which are dictated by a maximum heat that can be extracted from an SOFC module (e.g., SOFC module 315) during stable operation. Accordingly, an electrolysis power rating at which an SOEC module (e.g., SOEC module 395) becomes thermally limited can be 5× or greater compared to that of an equivalent SOFC module (e.g., SOFC module 315). Thus, from a controls and stability perspective, it is generally easier, to rapidly change a power level of an SOEC module (e.g., SOEC module 395) than that of an equivalent SOFC module (e.g., SOFC module 315).

For example, an electrolyzer, such as SOEC module 395, may be configured to absorb approximately 1.3 W/cm$^2$ (i.e., power per unit active area of cells within the SOEC module 395) or greater while operating near a thermally neutral condition as compared to standard fuel cells, such as SOFC module 315, which may produce approximately 0.25 W/cm$^2$ while operating exothermically. Accordingly, incorporation of the SOEC 395 within the exhaust processing module 375 may allow the fuel cell system 300 to contribute to grid stabilization at a faster rate compared to a conventional system (e.g., fuel cell system 200). In various embodiments, the SOFC module 315 may be operated according to a time averaged load condition or requirement, whereas the SOEC module 395 may offer high speed modulation above or below the average condition (e.g., +/−10%).

In various embodiments, the SOEC module 395 may be configured to act as a reducing gas source to protect the anode of the SOFC module 315. In various embodiments, the SOEC module 395 may be configured to introduce reducing gas over a period of time during or immediately following a shutdown event or during startup. In various embodiments, the SOEC module 395 may be configured to control generation of reducing gas in the SOEC module 395 by monitoring a cell voltage in the SOFC module 315, which generates a voltage proportional to the fuel content (e.g., as defined by the Nernst equation) when the SOFC module 315 is not generating power.

In various embodiments, the fuel cell system 300 may be operably coupled to one or more controllers, the one or more controllers configured to control operation of the SOFC module 315, the SOEC module 395, and/or other components included within the fuel cell system 300. Accordingly, in various embodiments, the fuel cell system 300 may be configured to monitor a composition of fuel gas input within the SOFC module 315 (e.g., within input fuel line 330) and/or the SOEC module 395 (e.g., depleted fuel stream portion 370). In various embodiments, the fuel cell system 300 may be configured to monitor a composition of fuel gas output from the SOFC module 315 (e.g., within depleted fuel gas stream 345) and/or the SOEC module 395 (e.g., enriched stream 385 and/or recycle stream 420). Accordingly, the controller may be configured to set and/or adjust one or more operating conditions of the fuel cell system 300 based on monitored fuel gas composition within the system 300. In various embodiments, the fuel cell system 300 may be configured to implement a fuel gas composition following protocol, wherein upon determination (e.g., by the controller) that a fuel gas composition fails to satisfy one or more predetermined thresholds, the SOFC module 315 and/or SOEC module 395 may cooperatively or complementarily adjust operation to return the fuel gas composition (i.e., at an inlet and/or outlet within the system 300) to a satisfactory level. In various embodiments, the fuel cell system 300 may be configured to adjust an amount of fuel gas provided by the fuel supply 325 based on a fuel gas determination (e.g., by the controller).

In various embodiments, the fuel cell system 300 may be configured to adjust an amount of fuel gas to module and amount of reforming on stacks in the SOFC module 315 during transient events. In various embodiments, in order for the fuel cell system 300 to follow load transitions that might otherwise exceed a system response rate, the fuel cell system 300 may release some $CO_2$ to the environment during these transients. For example, if a fuel cell plant must undergo a rapid unload, a conventional system (such as fuel cell system 200) might expose SOFC stacks (e.g., within SOFC module 215) to a significant endotherm as unreformed fuel gas may flow into the partially or fully unloaded stack before the fuel cell system has time to reduce gas flows at the stack. In contrast, the fuel cell system 300 may be configured to increase the demand at the SOEC module 395 quickly to start a net plant unload process without unloading the SOFC module 315. Accordingly, as the fuel cell system 300 process control adjusts (e.g., via the controller) to reduces the supply of fuel gas (e.g., from supply 325), the SOEC 395 may follow the SOFC module 315 unload profile, while continuing to add hydrogen to the recycle stream 420. Such hydrogen addition into the recycle stream 420 may aid in keeping the SOFC module 315 reduced in the event of a longer unload event, in addition to maintaining a fuel rich environment should a power demand on the fuel cell system 300 increase quickly. In various embodiments, if the power demand increases quickly, the SOEC module 395 power can be reduced, simultaneously increasing net power output of the fuel cell system 300 and reducing the SOFC module 315 loading rate.

Computational modeling data of $CO_2$ capture-enabling fuel cell system 300 versus conventional fuel cell system 200 has shown viability of operation and indicated improved performance due to implementation of the SOEC module 395 and water knockout unit 303 within the exhaust processing module 375. By way of summary, Table 1 below illustrates relative performance parameters of the fuel cell system 300 as compared to the conventional fuel cell system 200.

TABLE 1

|  | Carbon Capture (Fuel cell system 300) | No Carbon Capture (Fuel cell system 200) |
|---|---|---|
| Net efficiency | 61.8% | 61.6% |
| System electrochemical fuel utilization (SOFC energy/inlet fuel energy) | 100% | 85% |
| Gross stack power output | 326.9 kW | 282.2 kW |
| Net system power output | 250 kW | 250.0 kW |
| Operating cell voltage (SOFC) | 0.840 V | 0.850 V |
| System outlet $CO_2$ concentration (dry %) | 100% | 5.2% |
| Stack inlet conditions | | |
| Stream numbers | 130, 330 | 30, 230 |
| Temperature | 652.9° C. | 688° C. |
| Molar flow | 4.58 mol/s | 3.73 mol/s |
| Per pass fuel utilization | 68.5% | 64.5% |
| $CH_4$ concentration | 11.0% | 13.6% |
| $H_2$ concentration | 13.0% | 10.7% |
| CO concentration | 7.3% | 6.6% |
| $CO_2$ concentration | 31.8% | 22.3% |
| $H_2O$ concentration | 37.0% | 46.9% |

As appreciated from Table 1, incorporation of the SOEC module 395 with the SOFC module enables a net increase in efficiency while increasing the exhaust $CO_2$ concentration from just over 5 dry % to arbitrarily close to 100 dry % in the exhaust stream 365.

Furthermore, for a given net power output of fuel cell system 300, which includes both production by the SOFC module 315 and consumption by the SOEC module 395, the fuel cell system 300 may require a larger SOFC module 15 (i.e., to facilitate higher contribution by the SOFC module 315, such as 16% higher than a baseline amount). In various embodiments, the SOEC module 395 may be configured to run at a higher current compared to that of a conventional fuel cell system (e.g., fuel cell system 200), which may reduce a net increase in cells (or total cell active area) that must be included in fuel cell system 300 to provide the carbon capture functionality (e.g., an overall 20 to 25% increase). \ In various embodiments, the fuel supply of the system 300 may be approximately 3-5% greater compared to a conventional system (e.g., fuel cell system 200) despite a 14% greater SOFC module 315 contribution and a 20-25% increase in cells by the SOEC module 395.

Moreover, despite the existence of competing approaches for enabling carbon capture, a fuel cell system such as the fuel cell system 300 provides superior operation characteristics in comparison. By way of summary, Table 2 below illustrates operational parameters of the fuel cell system 300 compared to baseline conventional systems (e.g., fuel cell system 200) and an alternative, competing system directed to $CO_2$ separation.

TABLE 2

|  | Baseline (Fuel cell system 200) | Competing System | Carbon Capture (Fuel cell system 300) |
|---|---|---|---|
| Stack gross DC power | 282.2 kW | 287.5 kW | 326.9 kW |
| System net DC out | 250.0 kW | 250.0 kW | 250.0 kW |
| System fuel utilization | 85% | 85% | 100% |
| Recycle ratio | 68% | 68% | 78% |
| Stack fuel utilization | 64.5% | 64.4% | 68.5% |
| Resultant Characteristics | | | |
| Average cell voltage [V/cell] | 0.850 | 0.850 | 0.840 |
| System efficiency | 61.5% | 60.4% | 61.8% |
| Cell count (SOFC & SOEC) | 100% | 102% | 120% |
| Recycle blower power | 100% | 102% | 123% |
| Air blower power | 100% | 102% | 104% |
| Outlet $CO_2$ purity (dry %) | 5.2% | 96.7% | 100% |
| Balance of impurities | $N_2$, $O_2$ | $N_2$, $H_2$, CO | Trace $H_2$, CO |
| Exhaust condensed water-mol/s | 1.116 | 1.030 | 1.013 |

As appreciated from Table 2, the data in which was collected using computational modeling methods (i.e., HYSYS chemical process simulation) and supported by single cell testing, incorporation of the SOEC module 395 with the SOFC module 315 requires a higher gross power output by the SOFC module 315, with higher system fuel utilization and SOFC stack (within the SOFC module 315) fuel utilization. Furthermore, the fuel cell system 300 is comparably able to operate at greater efficiency and produce a $CO_2$ output (i.e., within the exhaust stream 365) having a higher purity with only trace amounts of impurities. Furthermore, as compared to a state of the art competing system based on oxy-combustion, the fuel cell system 300 requires a modest cell count increase (e.g., +20%), and a modest increase in other process equipment (e.g., air blower, fuel blower) while producing near pure $CO_2$ output exhaust, which may be readily be redirected for downstream use applications without additional processing. Competing state of the art oxy-combustion based systems result in lower overall efficiency and provide lower purity exhausted $CO_2$, which limits commercial applicability, while also having higher capital costs and providing reduced operational flexibility. Furthermore, although competing amine absorption $CO_2$ capture technologies may be relatively well understood, these technologies present high capital and operating cost challenges. For example, the US DOE suggests that post-combustion carbon capture drives electricity costs up by 80% and imposes an efficiency penalty of 20% to 30%. See U.S. Department of Energy, website, page titled "Post-Combustion Carbon Capture Research," last accessed Nov. 30, 2020, available at https://www.energy.gov-/fe/science-innovation/carbon-capture-and-storage-research/carbon-capture-rd/post-combustion-carbon. No competing carbon capture approach offers the combination of high efficiency, relatively low capital cost, and high $CO_2$ purity as the fuel cell system 300.

Notwithstanding the embodiments described above in FIGS. 1-4, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent. Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A fuel cell system comprising:
    a solid oxide fuel cell module having an inlet and an outlet, the fuel cell module configured to receive a fuel stream comprising gaseous fuel at the inlet and to expel a depleted fuel stream from the outlet; and
    a solid oxide electrolysis cell module in fluid communication with the fuel cell module;
    wherein the solid oxide electrolysis cell module is disposed relative to the fuel cell module such that waste heat from the fuel cell module is usable by the solid oxide electrolysis cell module;
    wherein the fuel cell system is configured to direct a first portion of the depleted fuel stream to the solid oxide electrolysis cell module, the depleted fuel stream comprising steam and carbon dioxide;
    wherein the solid oxide electrolysis cell module is configured to subject the steam and carbon dioxide in the first portion of the depleted fuel stream to co-electrolysis using the waste heat from the fuel cell module to produce a fuel-enriched stream comprising hydrogen and carbon monoxide; and
    wherein the fuel cell system is configured to direct the fuel-enriched stream to the inlet of the fuel cell module.

2. The fuel cell system of claim 1, further comprising a controller, the controller configured to operate the solid oxide electrolysis cell module endothermically.

3. The fuel cell system of claim 1, wherein the fuel cell module comprises at least one solid oxide fuel cell.

4. The fuel cell system of claim 3, wherein the solid oxide electrolysis cell module comprises at least one solid oxide electrolysis stack.

5. The fuel cell system of claim 4, wherein the solid oxide electrolysis cell module is contained within the fuel cell module.

6. The fuel cell system of claim 5, wherein the fuel cell module comprises a plurality of fuel cell stacks, wherein a first subset of the plurality of fuel cell stacks are solid oxide fuel cells, and wherein a second subset of the plurality of fuel cell stacks are solid oxide electrolysis stacks.

7. The fuel cell system of claim 4, wherein the solid oxide electrolysis cell module is separate from the fuel cell module.

8. The fuel cell system of claim 4, wherein the solid oxide electrolysis cell module comprises a plurality of branches electrically connected in parallel, each of the plurality of branches comprising at least one solid oxide electrolysis stack, and each solid oxide electrolysis stack comprising a plurality of solid oxide electrolysis cells.

9. The fuel cell system of claim 1, further comprising an afterburner in fluid communication with the fuel cell module and disposed downstream of the outlet.

10. The fuel cell system of claim 9, wherein the afterburner is configured to receive a second portion of the depleted fuel stream and to produce a first exhaust stream by reacting unreacted fuel within the second portion.

11. The fuel cell system of claim 10, wherein the solid oxide electrolysis cell module is configured to expel oxygen produced during co-electrolysis of the first portion in an outlet stream.

12. The fuel cell system of claim 11, wherein the fuel cell system is configured to direct the outlet stream to the afterburner, and wherein oxygen from the first outlet stream facilitates combustion of the unreacted fuel that is included within the first portion.

13. The fuel cell system of claim 12, wherein the afterburner is configured to expel a second exhaust stream comprising carbon dioxide.

14. The fuel cell system of claim 1, further comprising a controller configured to operate the solid oxide electrolysis cell module to provide a reducing gas to the fuel cell module.

15. The fuel cell system of claim 14, wherein the controller is configured to operate the solid oxide electrolysis cell module to provide the reducing gas during a shutdown event of the fuel cell system.

16. A method of operating a fuel cell system, the method comprising:
    expelling, by a fuel cell module, a depleted fuel stream from an outlet, the fuel cell module configured to receive gaseous fuel at an inlet;
    receiving, by a solid oxide electrolysis cell module, a first portion of the depleted fuel stream, the first portion comprising carbon dioxide and steam;
    producing, by the solid oxide electrolysis cell module, a fuel-enriched stream comprising hydrogen and carbon monoxide from the first portion of the depleted fuel stream by subjecting the steam and carbon dioxide in the first portion to co-electrolysis using waste heat from the fuel cell module; and
    directing, by the fuel cell system, the fuel-enriched stream produced by the solid oxide electrolysis cell module to the fuel cell module.

17. The method of claim 16, further comprising:
    receiving, by an afterburner in fluid communication with the fuel cell module, a second portion of the depleted fuel stream; and
    producing, by the afterburner, a first exhaust stream by reacting unreacted fuel within the second portion.

18. The method of claim 16, further comprising:
    removing, by a water knockout unit in fluid communication with the solid oxide electrolysis cell module, water from at least a portion of the fuel-enriched stream.

19. The method of claim 16, further comprising:
    operating, by a controller in communication with the fuel cell system, at least one of the fuel cell module or the solid oxide electrolysis cell module based on a composition of the depleted fuel stream.

20. The method of claim 19, wherein the controller is configured to adjust at least one operating condition of the fuel cell system based on a composition of gaseous fuel within the fuel cell system.

* * * * *